United States Patent [19]

Cournane

[11] Patent Number: 5,233,352
[45] Date of Patent: Aug. 3, 1993

[54] LEVEL MEASUREMENT USING AUTOCORRELATION

[76] Inventor: Thomas C. Cournane, 4475 de Maissonneuve Blvd. West, Montreal, Quebec, Canada, H3Z 1L8

[21] Appl. No.: 880,500

[22] Filed: May 8, 1992

[51] Int. Cl.[5] .......................................... G01S 13/34
[52] U.S. Cl. .................................................. 342/124
[58] Field of Search ........................................ 342/124

[56] References Cited

U.S. PATENT DOCUMENTS

| | | | |
|---|---|---|---|
| 4,044,353 | 8/1977 | Levy | 342/124 |
| 4,596,144 | 6/1986 | Panton et al. | 73/620 |
| 4,661,817 | 4/1987 | Bekkadal et al. | 342/124 |
| 4,665,403 | 5/1987 | Edvardsson | 342/124 |
| 4,700,569 | 10/1987 | Michalski et al. | 364/509 X |
| 4,807,471 | 2/1989 | Cournane et al. | 324/632 X |
| 4,847,623 | 7/1989 | Jean et al. | 342/124 |
| 4,972,386 | 11/1990 | Lau | 367/99 |
| 5,053,775 | 10/1991 | Mawhinney et al. | 342/124 |
| 5,070,730 | 12/1991 | Edvardsson | 342/124 X |
| 5,115,242 | 5/1992 | Nagamune et al. | 342/124 |
| 5,148,177 | 9/1992 | Nagamune et al. | 342/124 |
| 5,182,565 | 1/1993 | Nagamune et al. | 342/124 |

*Primary Examiner*—John B. Sotomayor
*Attorney, Agent, or Firm*—Chilton, Alix & Van Kirk

[57] ABSTRACT

First and second identical pseudo-random binary sequences are generated. The second sequence is delayed in a variable delay arrangement, and a reflected first sequence is compared with a delayed second sequence. The second sequence is delayed until the reflected sequence and the delayed sequence are coincident. The delay of the adjustable delay is equal to the travel time of the first sequence.

21 Claims, 3 Drawing Sheets

LEVEL MEASUREMENT USING AUTOCORRELATION

BACKGROUND OF INVENTION

1. Field of the Invention

The invention relates to a novel method and apparatus for determining the level of material in a silo or the like. More specifically, the invention relates to such a method and apparatus which utilizes mathematical autocorrelation techniques.

2. Description of Prior Art

Methods and apparatus for determining levels of material in silos are known in the art. In a general overview, the prior art apparatus will use ultrasound waves, capacitance probes, mechanical approaches or approaches wherein EM waves are deflected from the top surface of the material, and the time travel of the EM wave is measured to determine the level of the material.

In the ultrasound approach, the echo of a pulse is detected to measure distance. The problem with this approach is that the velocity of longitudinal sound waves changes with temperature, pressure, humidity, and dust-laiden air. In addition, the pulse signal is dispersed and scattered by dust and particles in a tank or silo so that operation is unreliable or impossible during a fill cycle. Further, the echo can be lost due to low density absorbent products, foaming liquids and scattering of irregular and sloping product surfaces. Another difficulty is that the long wavelength of ultrasound makes it impossible to focus a signal. In deep narrow silos, the signal cannot be targeted on the product. Further, spurious indirect echoes off tank walls will mask returns from product surfaces making the method even more unreliable. Plant noise and vibration will also interfere with ultrasonic receivers.

In the capacitance probe approach, the level of material in a silo or the like is indicated by the capacitance of wires or probes installed in the tank. As the material has a different dielectric constant than air, the capacitance of the wire or probe will alter with the change in level of the material in the tank.

For applications in products with large variations in dielectric constants, this technique is unworkable. As most dry bulk powders and granulates have a low dielectric constant whereas water has a high value, variations, even small, of moisture content in bulk product causes very large calibration errors.

In addition, the sensing wire must be fixed relative to the tank wall to maintain constant capacitor geometry. In large bulk material silos, lateral slipping of the product will break a tethered sensor wire so that the system becomes completely unusable.

In a mechanical approach, also known as a "yo-yo" approach, a weight on a string is dropped into the silo and the level is determined by measuring the length of string payed out prior to loss of tension in the string on the weight impacting on the top level of the material. Such mechanical devices are prone to failure in harsh, dusty environments and they provide a very slow-acting sampler. In addition, the mechanical devices cannot be used when the silo is being filled as the weight will get trapped.

The EM deflection approach uses either conventional pulse-echo EM waves or CW waves. Such an approach will work only in large diameter tanks with a flat, smooth product surface. For a practical antenna size (diameter—one foot maximum), and for the wavelengths used in conventional such systems, the signal cannot be focussed to target only on the top surface of the material in the tank.

For dry bulk products, the reflecting surface is invariably sloping. Thus, the pulses or continuous waves will be reflected at an angle to the longitudinal axis of the silo and will thence be deflected off the silo or tank walls. Such indirect signals off the walls will also enter the receiver due to the wide beam width of the antenna causing serious errors.

Specific examples of prior art devices are illustrated in U.S. Pat. No. 4,596,144, Panton et al, Jun. 24, 1986, U.S. Pat. No. 4,661,817, Bekkadal et al, Apr. 28, 1987, U.S. Pat. No. 4,700,569, Michalski et al, Oct. 20, 1987, and U.S. Pat. No. 4,807,471, Cournane et al, Feb. 28, 1989.

In U.S. Pat. No. 4,596,144, the top level of material in a silo is determined by directing at least one transducer 2, of a system with a plurality of transducers into the silo. The transducers are then activated one at a time by acoustic pulses, and the reflected signals are processed by a receiver having three channels, each with different characteristics (FIG. 2). The outputs of the three channels are summed to provide a composite response signal. The composite signal is then digitized and fed to a RAM 26 of CPU 30. The shots from the different transducers are then processed, as per the flow chart of FIG. 12 in the Patent, to determine the level of the material in the silo.

In the '817 patent, part of a generated FM signal is transmitted from a transducer into a silo and the remainder is used as a reference signal. The reflected signal and the reference signal are then used to obtain a value for the input reflection co-efficient of the antenna. This value is subjected to a Fourier transformation process at a predetermined set of measuring frequencies, and the distance from the antenna to the surface is calculated from the transformation process values.

If the '569 patent, a series of acoustic pulses are transmitted from a transducer into a silo. The echo pulses are converted to electrical envelope signals representative of the envelope curves of the echo pulses. The echo signals are then transmitted to an evaluation station where they are evaluated to determine the distance from the antenna to the top of the material in the silo. The evaluation station is a computer and the envelope signals are digitized in an ADC before being transmitted to the microprocessor.

In the '471 patent, an elongated cable extends into the silo or the like and the output of a swept frequency generator is fed to the cable. The swept frequency generator is automatically and continuously swept through a pre-selected frequency range. Peak voltages will occur at frequency intervals, the frequency intervals being a function of the level of the material in the silo or the like. The frequency intervals are detected to determine the level of the material.

SUMMARY OF INVENTION

It is an object of the invention to provide a method and apparatus for determining the level of material in a silo or the like which overcomes difficulties of methods and apparatus available in the prior art.

It is a more specific object of the invention to provide such a method and apparatus which utilizes a mathematical autocorrelation technique.

In accordance with a particular embodiment of the invention, there is provided an apparatus for determining the level of material in a silo, said material having an upper surface, comprising:

generator means for generating a first electrical pulse train comprising a first pseudo-random binary sequence at a first bit rate;

means for providing a second electrical pulse train comprising a second pseudo-random binary sequence at a second bit rate, said second electrical pulse train being delayed relative to said first electrical pulse train;

said first pseudo-random binary sequence being identical to said second pseudo-random binary sequence and said first bit rate being identical to said second bit rate;

means for transmitting said first electrical pulse train into said silo, whereby said pulse train is reflected at said upper surface to provide a reflected electrical pulse train having a reflected pseudo-random binary sequence;

means for receiving said first pulse train reflected from said upper surface;

means for comparing said reflected pseudo-random binary sequence of said reflected pulse train with said second pseudo-random binary sequence;

means for identically adjusting the bit rates of said first pseudo-random binary sequence and said second pseudo-random binary sequence until said compared reflected pseudo-random binary sequence and said second pseudo-random binary sequence coincide;

whereby, to determine the time of travel of said first pulse train from said means for transmitting to said upper surface utilizing mathematical autocorrelation techniques.

In accordance with a further particular embodiment of the invention, there is provided an apparatus for determining the level of material in a silo, said material having an upper surface, comprising:

first generator means for generating a first electrical pulse train comprising a first pseudo-random binary sequence at a first bit rate;

second generator means for generating a second electrical pulse train comprising a second pseudo-random binary sequence at a second bit rate;

said first pseudo-random binary sequence being identical with said second pseudo-random binary sequence and said first bit rate being identical with said second bit rate;

means for delaying said second pseudo random binary sequence relative to said first pseudo-random binary sequence by a time interval equal to an integral number of bit periods;

means for transmitting said first electrical pulse train into said silo, whereby said pulse train is reflected at said surface to provide a reflected electrical pulse train having a reflected pseudo-random binary sequence;

means for receiving said reflected electrical pulse train;

means for comparing said reflected pseudo-random binary sequence of said reflected pulse train with said second pseudo-random binary sequence;

means for identically adjusting the bit rates of said first pseudo-random binary sequence and said second pseudo-random binary sequence until said reflected pseudo-random binary sequence and said second pseudo-random binary sequence coincide in said means for comparing;

whereby, to determine the time of travel of said first pulse train from said means for transmitting to said upper surface utilizing mathematical autocorrelation techniques.

From a different aspect and in accordance with a particular embodiment of the invention there is provided a method for determining the level of material in a silo, said material having an upper surface, comprising:

generating a first electrical pulse train comprising a first pseudo-random binary sequence at a first bit rate;

providing a second electrical pulse train comprising a second pseudo-random binary sequence at a second bit rate, said second electrical pulse train being delayed relative to said first electrical pulse train;

said first pseudo-random binary sequence being identical with said second pseudo-random binary sequence and said first bit rate being identical with said second bit rate;

transmitting said first electrical pulse train into said silo, whereby said first electrical pulse train is reflected at said upper surface to provide a reflected electrical pulse train having a reflected pseudo-random binary sequence;

receiving said reflected electrical pulse train;

comparing said reflected pseudo-random binary sequence of said reflected electrical pulse train with said second pseudo-random binary sequence;

identically adjusting the bit rates of said first pseudo-random binary sequence and said second pseudo-random binary sequence until said reflected pseudo-random binary sequence coincides with said second pseudo-random binary sequence;

whereby, to determine the travel time of said first electrical pulse train to said upper surface.

In accordance with a further particular embodiment of the second aspect there is provided a method for determining the level of material in a silo, said material having an upper surface, comprising:

1. generating a first electrical pulse train comprising a first pseudo-random binary sequence at a first bit rate;
2. generating a second electrical pulse train comprising a second pseudo-random binary sequence at a second bit rate;
3. said first pseudo-random binary sequence being identical with said second pseudo-random binary sequence and said first bit rate being identical with said second bit rate;
4. delaying said second pseudo random binary sequence relative to said first pseudo-random binary sequence by a time interval equal to an integral number of bit periods;
5. transmitting said first electrical pulse train into said silo, whereby said pulse train is reflected at said surface to provide a reflected electrical pulse train having a reflected pseudo-random binary sequence;
6. receiving said reflected electrical pulse train;
7. comparing said reflected pseudo-random binary sequence of said reflected pulse train with said second pseudo-random binary sequence;
8. identically adjusting the bit rates of said first pseudo-random binary sequence and said second pseudo-random binary sequence from a minimum bit rate to a maximum bit rate to attempt to achieve coincidence between said reflected pseudo-random binary sequence and said second pseudo-random binary sequence in said means for comparing;
9. if coincidence is not achieved, further delaying said second pseudo-random binary sequence relative to said first pseudo-random binary sequence to increase said time interval by one bit period;

10. repeating steps 8 and 9 until coincidence is achieved;

whereby, to determine the time of travel of said first pulse train from said means for transmitting to said upper surface utilizing mathematical autocorrelation techniques.

BRIEF DESCRIPTION OF DRAWINGS

The invention will be better understood by an examination of the following description, together with the accompanying drawings, in which.

Like reference numerals in the drawings indicate like elements.

DESCRIPTION OF PREFERRED EMBODIMENTS

Figure 1:
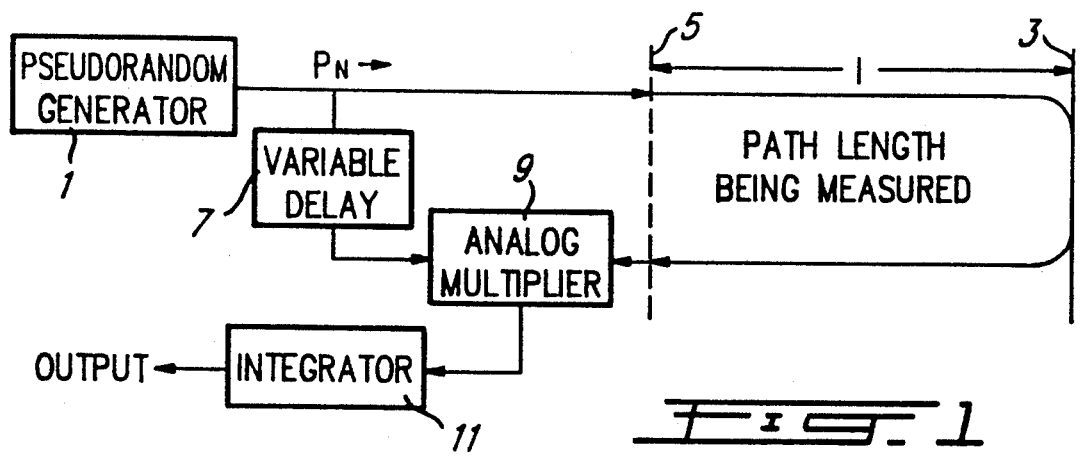
FIG. 1 is a block diagram of the circuit illustrating the underlying concept of the invention herein.

Referring to FIG. 1, pseudo-random generator 1 produces an electrical pulse train consisting of a pseudo-random binary sequence, that is, a sequence of zeros and ones appearing in a pseudo-random fashion. A specific embodiment of such a pseudo-random generator is discussed in connection with FIG. 2 below.

The pulse train is transmitted in the direction of an object 3, whose distance is to be determined, for example, the top surface of material in a silo, from a point 5. The pulse train is also fed to the input of a variable delay device 7, whose output is fed to one input terminal of an analog multiplier 9.

The pulse train transmitted from the point 5 is reflected by the object 3 to the second input terminal of analog multiplier 9. As is well known, the distance 1 between 5 and 3 can be determined by measuring the time of travel of the pulse train from the point 5 to the object 3 and back to 5 again.

The output of the analog multiplier 9 is fed to the input of an integrator 11.

Figure 2:
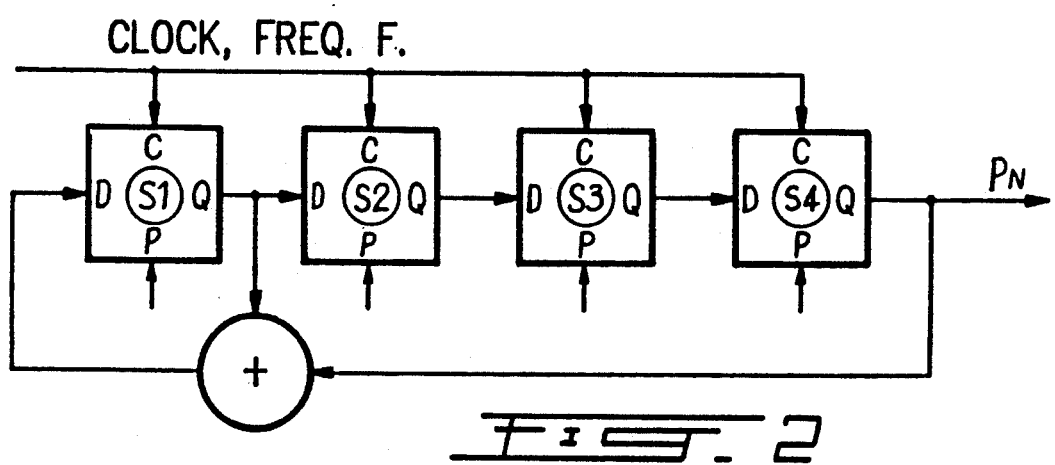
FIG. 2 illustrates in block diagram form a pseudo-random binary sequence generator.

Referring now to FIG. 2, the pseudo-random binary sequence is generated using cascaded binary shift registers with feedback connections through modulo-two addition logic. Such generators are well known in the art and FIG. 2 illustrates only a particular such generator. In FIG. 2, there are four stages, S1, S2, S3 and S4. Each stage includes a clock terminal C, a binary data input terminal D, a preset input terminal P, and an output terminal Q. Each stage includes a two-state device, for example, a flip-flop.

In operation, the output $P_N$ changes binary states at the clock frequency F, where $F=N/T$. (Where N=length of the sequence and T=period of the sequence.)

Normally, a $P_N$ sequence starts with all Q's=1 by setting all P's=1. As the clock cycles, the Q's change such that every possible combination for the Q outputs, except all zeros occurs once, and only once. By selectively initializing the P inputs, the sequence can be made to start at any selected point in the sequence. This provides a very simple way to implement a delay between two identical sequences.

As can be seen, such a generator produces a "random" binary sequence which is repeated at intervals T. The time interval of each bit is, of course, T/N.

If there are n stages in the generator, then the length of the sequence, N, is given by $N=2^n-1$. N can be made as large as needed by adding shift register stages.

$P_N$ is termed a maximal-length pseudo-random sequence. The order of the bits appears to be statistically random, but in fact the sequence repeats precisely every N bit. Accordingly, the term "pseudo-random".

As will be clear to any one skilled in the art, other coded sequences than the one illustrated in FIG. 2 could be used.

Returning now to FIG. 1, as above-mentioned, the pulse train is transmitted over the path whose length is being measured and back to one input of the analog multiplier 9. The delayed pulse train is multiplied by the reflected pulse train in the analog multiplier, and the output of the multiplier is connected to the input of the integrator 11.

If the calibrated variable time delay is set equal to the round trip delay over the measured path, the signals at both multiplier inputs correspond exactly in phase and in logical sequence. If each bit is considered to have a binary value of +1 or −1, both inputs are either simultaneously +1 or −1 and the multiplier output is therefore always +1. The multiplier output is integrated with time and normalized over the sequence period T giving an output of +1 from the integrator as will be more fully discussed below.

Together, the multiplier, integrator and variable delay perform the statistical autocorrelation function on the electrical pulse train. When the output of the integrator is +1, it indicates that the calibrated delay is set equal to the path delay. By factoring in the velocity over the path, the distance 1 is determined.

To measure range effectively, the output of the correlator must distinguish sharply between the "locked" and "unlocked" delay conditions. This is achieved by selecting a relatively long cycle for the sequence, i.e., a large value for N.

Figure 3:
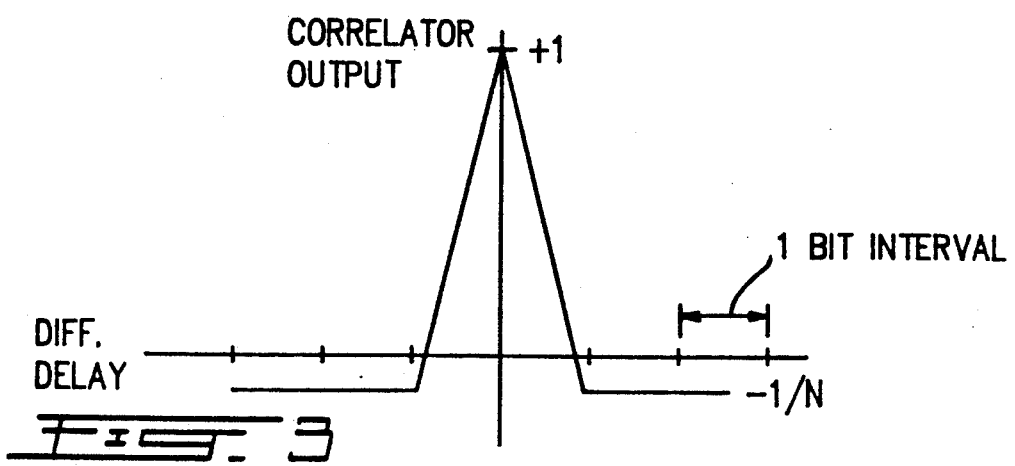
FIG. 3 illustrates the autocorrelation output.

This $P_N$ sequence has the autocorrelation 2 output as shown in FIG. 3. The output is +1 for zero differential delay at the multiplier inputs and drops linearly to −1/N for a time differential equal to one bit interval. For all other delays, the output is −1/N. This is a statistical property of this $P_N$ sequence. If a generator with several stages is used, say n=12, then $N=2^n-1=4095$, a large number, and 1/N is very small, effectively zero. Thus, by selection of the number of stages in the generator, as above described, a highly selective "locked" delay indicator can be implemented. The length of the unknown path can be measured simply by varying the delay over a range of predetermined values and monitoring the output for a peak (+1) value.

The above identified method and apparatus has significant advantages over those of the prior art above described and especially the real time pulse-echo measurements for the following reasons:

With autocorrelation, an essentially "static" measurement can be made not requiring the resolution in real time of the delay over the path to be measured. For useful resolution in real time tank or silo gauging using electromagnetic signals, say 1 inch or better, time must be measured with sub nanosecond resolution. This requires complex and expensive circuitry. The autocorrelation circuitry is radically simpler.

For real time related measurements, a high signal-to-noise ratio is requried to overcome noise induced errors. With autocorrelation, very high noise levels can be tolerated, higher than the signal in fact.

Since the correlation of the $P_N$ signal with extraneous noise returned with the echo signal is autocorrelator and very high levels can be tolerated without deteriorating the "locked" delay indication. This is a great advantage especially for a non-contact method where poor signal-to-noise ratios can be experienced due to difficult propagation conditions and poorly reflecting materials.

Figure 4:
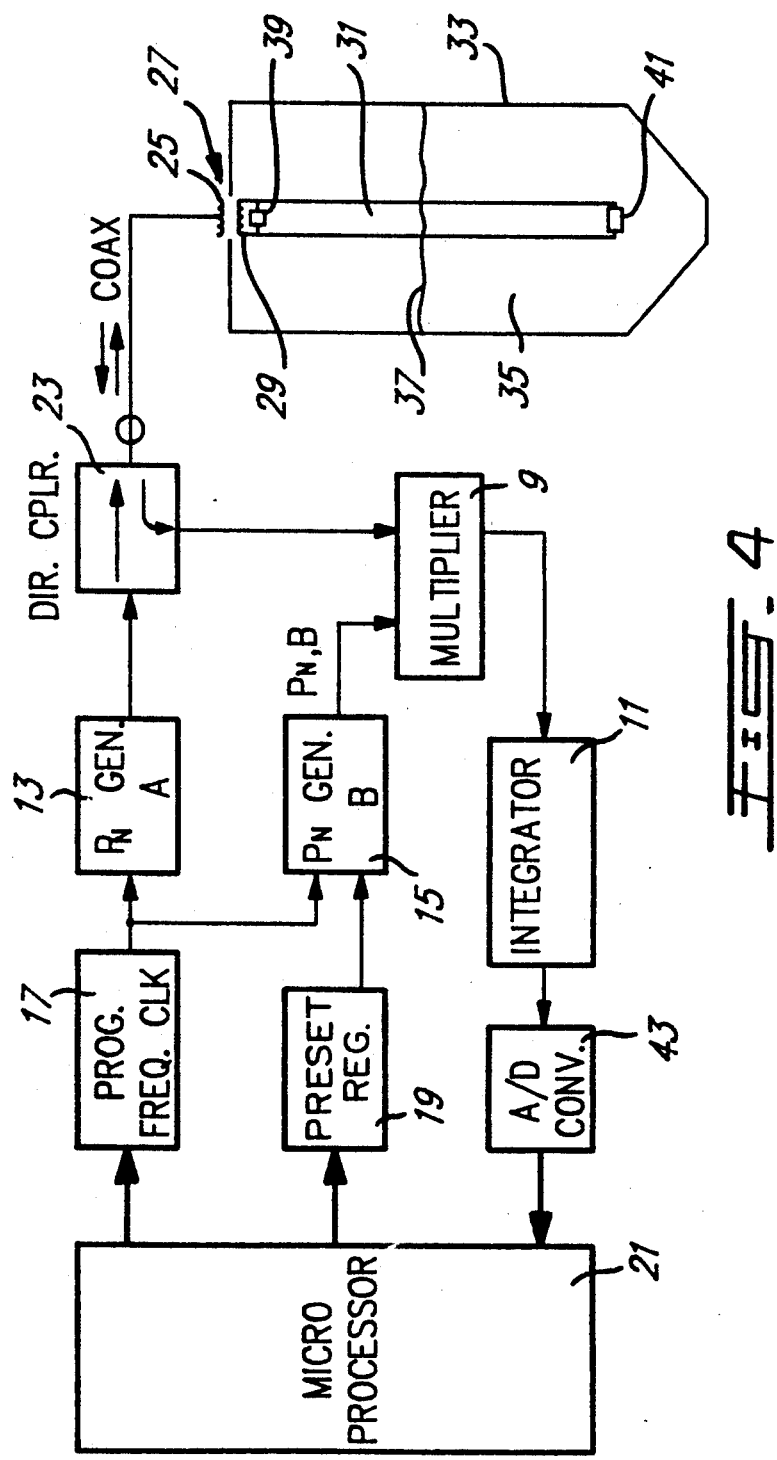
FIG. 4 illustrates, in block diagram form, an embodiment of the invention.

FIG. 4 illustrates an embodiment of implementing the invention using an open two conductor sensor element in the tank or silo. As seen in FIG. 4, the apparatus includes a first pseudo-random generator 13 and a second pseudo-random generator 15. Both generators 13 and 15 generate identical pseudo-random binary sequences of identical length, that is, they will have the identical binary shift generators with identical feedback connections of the type as illustrated in FIG. 2 above.

Generators 13 and 15 are both clocked by the same programmable frequency clock 17. The purpose of the register 19 is to implement a programmed delay between the output of generator 13 and the output of generator 15. For this purpose, the outputs of 19 are connected to respective ones of the P terminals of the shift registers forming generator 15 to initialize the P terminals whereby to set generator 15 at a predetermined point in the sequence. The predetermined point corresponds to a predetermined delay relative to generator 13. The delay is equal to an integral number one bit interval.

Both the programmable frequency clock 17 and the register 19 are under the control of a microprocessor 21.

The output of generator 13 is fed to a directional coupler 23 whose output is connected to the primary 25 of transformer 27. The secondary 29 of transformer 27 is connected across the two leads of the sensor 31. The sensor extends into the tank or silo 33 which is partially filled with material, such as a granular or liquid material, to a top surface 37.

The two conductor sensor element forms an electrical transmission line whose impedance is reduced in the immersed portion due to the higher dielectric constant of the material 35. A signal travelling down the probe will be reflected at the interface, that is, at the top surface 37 of the material.

The reflected pseudo-random binary sequence is returned to the directional coupler wherein it is directed to one input of multiplier 9. The other input of multiplier 9 is connected to the output of generator 15.

Once again, the output of the multiplier is connected to an integrator 11, and the output of the integrator 11 is fed to analog-to-digital converter 43 which then feeds a digital signal into the microprocessor 21.

By varying the clock frequency, the ratio of the differential delay between the output signals of generators generator 15 and 13 to the known bit interval can be varied directly as the frequency. This arrangement eliminates the need for a calibrated programmable delay. A digitally programmable fine resolution frequency synthesizer is relatively easy and inexpensive to produce.

In operation, the electric pulse train generated by generator 13 is transmitted into the sensor via the directional coupler 23 and a coaxial cable. The coupler isolates outgoing signals from return echoes and allows for a separation of the electronics from the tank or silo sensor unit 31 using a single coax. The sensor 31 is transformer balanced for suppression of spurious radiation and interference.

The return echo from the top surface 37 is fed, through the directional coupler 23, to the multiplier 9 which performs a multiplication of the reflected electric pulse train and the delayed electric pulse train from generator 15. The product is fed to an integrator, as above-described, and then converted to a digital signal in analog-to-digital converter 43. The amplitude of this digital signal is monitored by the microprocessor 21 to control both the programmable frequency clock 17 and the preset register counter 19.

Initially, generator 15 is set to a 1 bit interval delay, and the frequency is varied from a minimum to a maximum frequency. The correlator output is monitored for the peak $+1$ condition. If this is not found throughout the frequency range, generator 15 is set to a two bit differential interval and the frequency sweep is once again repeated. This process is repeated over the full measuring range until the $+1$ condition is located.

It will of course be understood that, in this embodiment, the travel time of the reflected electrical pulse train is the time it takes the signal provided by generator 13 to travel from the end of the coax adjacent to the directional coupler through the sensor to the surface 37 and back again.

Assuming that the frequencies are chosen such that, at the maximum frequency 1 bit corresponds to 1 foot and at the minimum frequency 1 bit corresponds to 2 feet, the search range is 1–2 feet for a 1 bit slip, 2 to 4 feet for 2 bit slips, 3 to 6 feet for 3 bit slips, etc. A very fine resolution is possible by choosing the programmable frequency steps sufficiently small.

With this method, it can be seen that individual echo-causing discontinuities can be isolated as the search can be focussed on individual increments of the full span. By introducing a deliberate mismatch 39 at the top end of the sensor (e.g , a resistor across the conductors) this echo can be used as a marker to automatically locate the top of the sensor. Similarly, a mismatched termination 41 can be placed at the bottom of the sensor. Likewise if the material 35 in the tank forms distinct layers the location of the interface(s) between the layers can be detected.

The circuitry for the above described embodiment can be implemented with standard devices and with no critical components.

Figure 5:
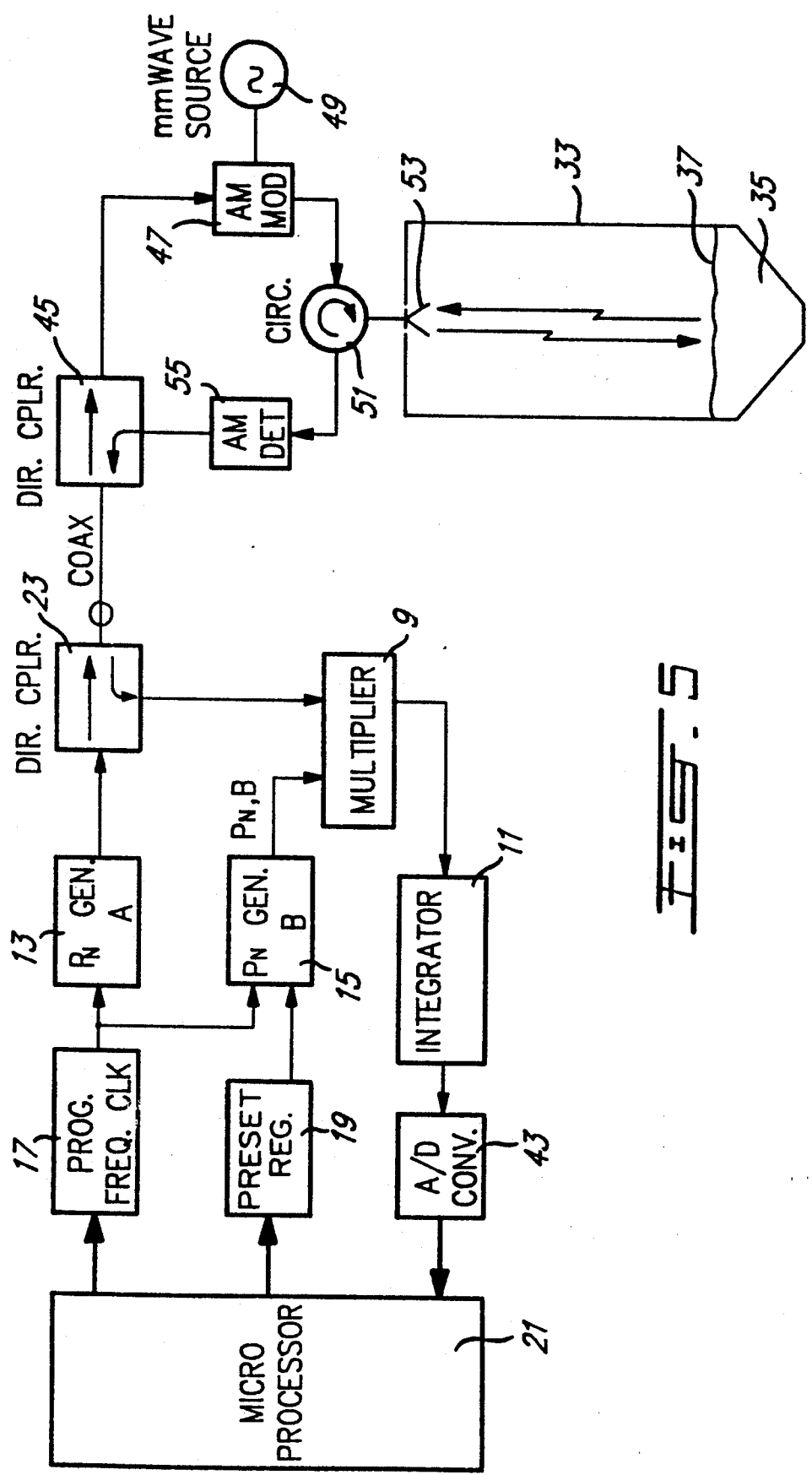
FIG. 5 illustrates, in block diagram form, a further embodiment of the invention.

A non-contact embodiment of the invention is illustrated in FIG. 5. As can be seen, FIG. 5 contains all of the elements 9, 11, 13, 15, 17, 19, 21, 23 and 43 as also contained in the FIG. 4 embodiment. The FIG. 5 embodiment includes a second directional 45, an AM modulator 47, a millimeter wave source 49, a circulator 51, an antenna 53 and an AM detector 55. The circulator 51 comprises a 3-port circulator with one port connected to the output of the AM modulator 47, a second port connected to the antenna 53, and a third port connected to an input of AM detector 55.

In operation, the output of generator 13 is fed, through directional coupler 23 and directional coupler 45, to the input of the AM modulator 47. A second terminal of the AM modulator is connected to the millimeter wave source 49 so that the electrical pulse train modulates the sine wave output of the millimeter wave source 49. The modulated carrier is coupled to the antenna 53 via the circulator 51. The purpose of the circulator is to isolate the transmitted waves from the received waves.

The modulated carrier is radiated downwards, bounces off the top surface 37 of the product 35 in the silo or tank 33, and is reflected back to the antenna 51. The reflected signal is coupled, via the circulator 51, to the AM detector 55 to separate out the sine wave carrier so that the output of the AM detector is once again an electrica; pulse train. The reflected electrical pulse train is directed to an input of multiplier 9 through directional couplers 45 and 23. At that point, the analysis of the FIG. 5 embodiment is identical to the analysis of the FIG. 4 embodiment.

As will be clear to anyone skilled in the art other modulation and detection types than the one illustrated in FIG. 5 could be used.

The non-contact method has obvious advantages where the material in the tank is abrasive, or where there is agitation or product shifting, which could damage a probe. It also has the advantage of not requiring that the probe be customized to each tank size.

Millimeter wave frequencies (40 GHz or higher) are preferred over more conventional lower microwave a, frequencies now used for short range detection for the following reasons:

In a tank, a practical antenna diameter is about 12 inches maximum. At the lower microwave frequencies, this diameter is too small to focus the energy and the signal spreads and hits the walls. This is a problem in tall tanks and especially so in the tall narrow silos which are widely used to store granular and powdered products. At millimeter wave frequencies, a 12" antenna produces a narrow sharply focused beam, allowing the energy to target the product and not the tank walls.

At lower frequencies, the major part of the energy incident on the product surface 37 is reflected off-axis if the surface is not flat and smooth, which is invariably the case with bulk solids. Since the antenna beam width is wide it offers little discrimination to indirect energy bounced off the tank walls. This produces large errors (ultrasound suffers badly from this problem).

At millimeter wave frequencies the energy level returned is more or less independent of the angle of incidence with the reflecting surface 37. At such short wavelengths the energy is essentially scattered due to surface roughness, independently of the angle of incidence. While energy is scattered into the walls, only that reflected back directly on the antenna axis is passed to the receiver. Because the antenna beamwidth is very narrow oblique reflections off the walls are rejected.

For a given diameter antenna, the gain is greater at higher frequencies. Since the antenna is used to transmit and receive, for a given diameter, the gain at 60 GHz is greater than that at 10 GHz by the 4th power of the frequency ratio ($6^4$). This is offset by a quadratic increase in propagation loss for the higher frequency leaving a net quadratic gain i.e. $6^2$ or 36. This is very significant for tank instrumentation where a large diameter antenna (12" max) is impractical.

As in the FIG. 4 embodiment, the production of the system illustrated in FIG. 5 is both simple and inexpensive. The millimeter wave transceiver consists of only three primary electronic components, all diodes. These are: a Gunn diode to generate the millimeter wave carrier; a PIN diode for AM modulation; and a Schottky diode AM detector. The circuitry is not complex and is relatively inexpensive. In fact, this type of arrangement would normally be considered a poor radio transceiver, mainly because direct diode detection makes for a relatively noisy receiver. However, since the noise is random, it is suppressed by the action of the autocorrelator.

Given these factors, reliable operation is possible with physically small hardware, low transmitted millimeter wave power (100 mW or less) and uncomplicated circuitry. This is a major advantage over current non-contact ranging devices which only work in large diameter tanks containing undisturbed liquids.

Although particular embodiments have been described, this was for the purpose of illustrating, but not limiting, the invention. Various modifications, which will come readily to the mind of one skilled in the art, are within the scope of the invention as defined in the appended claims.

I claim:

1. Apparatus for determining the level of material in a silo, said material having an upper surface, comprising:

generator means for generating a first electrical pulse train comprising a first pseudo-random binary sequence at a first bit rate;

means for providing a second electrical pulse train comprising a second pseudo-random binary sequence at a second bit rate, said second electrical pulse train being delayed relative to said first electrical pulse train;

said first pseudo-random binary sequence being identical to said second pseudo-random binary sequence and said first bit rate being identical to said second bit rate;

·means for transmitting said first electrical pulse train into said silo, whereby said pulse train is reflected at said upper surface to provide a reflected electrical pulse train having a reflected pseudo-random binary sequence;

means for receiving said first pulse train reflected from said upper surface;

means for comparing said reflected pseudo-random binary sequence of said reflected pulse train with said second pseudo-random binary sequence;

means for identically adjusting the bit rates of said first pseudo-random binary sequence and said second pseudo-random binary sequence until said compared reflected pseudo-random binary sequence and said second pseudo-random binary sequence coincide;

whereby, to determine the time of travel of said first pulse train from said means for transmitting to said upper surface utilizing mathematical autocorrelation techniques.

2. Apparatus as defined in claim 1 wherein said means for transmitting said first electrical pulse train comprises a two-wire sensor element.

3. Apparatus as defined in claim 1 wherein said means for transmitting said first electrical pulse train comprises a radiating antenna.

4. A method for determining the level of material in a silo, said material having an upper surface, comprising:

generating a first electrical pulse train comprising a first pseudo-random binary sequence at a first bit rate;

providing a second electrical pulse train comprising a second pseudo-random binary sequence at a second bit rate, said second electrical pulse train being delayed relative to said first electrical pulse train;

said first pseudo-random binary sequence being identical with said second pseudo-random binary sequence and said first bit rate being identical with said second bit rate;

transmitting said first electrical pulse train into said silo, whereby said first electrical pulse train is reflected at said upper surface to provide a reflected electrical pulse train having a reflected pseudo-random binary sequence;

receiving said reflected electrical pulse train;

comparing said reflected pseudo-random binary sequence of said reflected electrical pulse train with said second pseudo-random binary sequence;

identically adjusting the bit rates of said first pseudo-random binary sequence and said second pseudo-random binary sequence until said reflected pseudo-random binary sequence coincides with said second pseudo-random binary sequence;

whereby, to determine the time of travel of said first pulse train from said means for transmitting to said upper surface utilizing mathematical autocorrelation techniques.

5. A method as defined in claim 4 wherein said first electrical pulse train is transmitted into said silo by a two-wire sensor element.

6. A method as defined in claim 4 wherein said first electrical pulse train is transmitted into said silo by a radiating antenna.

7. Apparatus for determining the level of material in a silo, said material having an upper surface, comprising:

first generator means for generating a first electrical pulse train comprising a first pseudo-random binary sequence at a first bit rate;

second generator means for generating a second electrical pulse train comprising a second pseudo-random binary sequence at a second bit rate;

said first pseudo-random binary sequence being identical with said second pseudo-random binary sequence and said first bit rate being identical with said second bit rate;

means for delaying said second pseudo random binary sequence relative to said first pseudo-random binary sequence by a time interval equal to an integral number of bit periods;

means for transmitting said first electrical pulse train into said silo, whereby said pulse train is reflected at said surface to provide a reflected electrical pulse train having a reflected pseudo-random binary sequence;

means for receiving said reflected electrical pulse train;

means for comparing said reflected pseudo-random binary sequence of said reflected pulse train with said second pseudo-random binary sequence;

means for identically adjusting the bit rates of said first pseudo-random binary sequence and said second pseudo-random binary sequence until said reflected pseudo-random binary sequence and said second pseudo-random binary sequence coincide in said means for comparing;

whereby, to determine the time of travel of said first pulse train from said means for transmitting to said upper surface utilizing mathematical autocorrelation techniques.

8. Apparatus as defined in claim 7 wherein said means for delaying said second pseudo-random binary sequence comprises a preset register connected to said second generator means.

9. Apparatus as defined in claim 8 wherein said means for adjusting the bit rates comprises a programmable frequency clock, said programmable frequency clock being connected to said first generator and to said second generator;

whereby, the bit rates of both said first and second generator means are controlled by said programmable frequency clock.

10. Apparatus as defined in claim 9 and further including a microprocessor;

both said preset register and said programmable frequency clock being controlled microprocessor.

11. Apparatus as defined in claim 10 and further including directional coupler means, said directional coupler means having a first input connected to said first generator means and a second input connected to said means for receiving, said directional coupler further having a first output means connected to said means for transmitting and a second output means;

multiplier means having a first input means connected to said second output means of said directional coupler and a second input means connected to said second generator means and an output means.

12. Apparatus as defined in claim 11 and further including integrator means having an input connected to the output means of said multiplier and an output;

an analog-to-digital converter having an input connected to the output of the integrator means an output connected to said microprocessor.

13. Apparatus as defined in claim 12 wherein said means for transmitting comprises a two-wire sensor element.

14. Apparatus as defined in claim 13 and further including a transformer having a primary and a secondary;

a coaxial cable connecting said primary to said first directional coupler;

said secondary being connected to said two-wire sensor element.

15. Apparatus as defined in claim 12 wherein said means for transmitting comprises a radiating antenna.

16. Apparatus as defined in claim 15 and further including an amplitude modulator having a modulating input and a signal input;

and still further including a millimeter wave. generator source having an output;

the output of the millimeter wave generator source being connected to the carrier input of said amplitude modulator;

said first electrical pulse train being connected to the modulating signal input of said amplitude modulator;

said amplitude modulator having an output means connected to said radiating antenna.

17. Apparatus as defined in claim 16 and having a circulator having a first input, a first output and a second output;

and further including an AM detector having an input and an output;

said output of said amplitude modulator being connected to said input of said circulator;

said first output of said circulator being connected to said radiating antenna;

said second output of said circulator being connected to said input of said AM detector.

18. Apparatus as defined in claim 17 and including a second directional coupler;

said first directional coupler being connected to said second directional coupler;

said second directional coupler having an output and an input;

said output of said second directional coupler being connected to said input of said amplitude modulator;

said input of said second directional coupler being connected to said output of said AM detector.

19. Method for determining the level of material in a silo, said material having an upper surface, comprising:

a. generating a first electrical pulse train comprising a first pseudo-random binary sequence at a first bit rate;

b. generating a second electrical pulse train comprising a second pseudo-random binary sequence at a second bit rate;

c. said first pseudo-random binary sequence being identical with said second pseudo-random binary sequence and said first bit rate being identical with said second bit rate;

d. delaying said second pseudo random binary sequence relative to said first pseudo-random binary sequence by a time interval equal to an integral number of bit periods;

e. transmitting said first electrical pulse train into said silo, whereby said pulse train is reflected at said surface to provide a reflected electrical pulse train having a reflected pseudo-random binary sequence;

f. receiving said reflected electrical pulse train;

g. comparing said reflected pseudo-random binary sequence of said reflected pulse train with said second pseudo-random binary sequence;

h. identically adjusting the bit rates of said first pseudo-random binary sequence and said second pseudo-random binary sequence from a minimum bit rate to a maximum bit rate to attempt to achieve coincidence between said reflected pseudo-random binary sequence and said second pseudo-random binary sequence in said means for comparing;

i. if coincidence is not achieved, further delaying said second pseudo-random binary sequence relative to said first pseudo-random binary sequence to increase said time interval by one bit period;

j. repeating steps h and i until coincidence is achieved;

whereby, to determine the time of travel of said first pulse train from said means for transmitting to said upper surface utilizing mathematical autocorrelation techniques.

20. A method as defined in claim 19 wherein said first electrical pulse train is transmitted into said silo by a two-wire sensor element.

21. A method as defined in claim 19 wherein said wherein said first electrical pulse train is transmitted into said silo by a radiating antenna.

* * * * *